June 27, 1967   W. H. GLAZIER ET AL   3,327,805

SYSTEM FOR PROCESSING SEISMIC SIGNALS

Filed Jan. 22, 1965

INVENTORS.
WALTER H. GLAZIER,
GEORGE W. SMITH,
BY John B. Davidson
ATTORNEY.

United States Patent Office 3,327,805
Patented June 27, 1967

3,327,805
SYSTEM FOR PROCESSING SEISMIC SIGNALS
Walter H. Glazier and George W. Smith, Calgary, Alberta, Canada, assignors, by mesne assignments, to Esso Production Research Company, Houston, Tex., a corporation of Delaware
Filed Jan. 22, 1965, Ser. No. 432,042
7 Claims. (Cl. 181—.5)

This is a continuation-in-part of co-pending application Serial No. 129,196 filed July 26, 1961, now abandoned. Application Serial No. 129,196 is a continuation-in-part of application Serial No. 46,975 filed on the 2nd day of August 1960, now abandoned. This invention relates to improvements in the art of determining the nature and position of subsurface strata by seismic methods. It is particularly concerned with a new method for processing a seismic signal.

A method commonly employed in searching for petroleum or other mineral deposits is that known as seismic prospecting wherein a seismic disturbance is initiated at a selected point in or near the earth's surface to direct seismic waves downwardly into the earth from that point. The waves continue to travel downwardly within the earth until they encounter discontinuities in the earth's structure in the form of various substrata formations and the like. These discontinuities have the effect of reflecting at least a portion of the seismic wave back toward the surface of the earth. Sensitive pickups called seismic detectors, seismometers or geophones are arranged at the detection points to translate the detected motion into electrical impulses which after suitable amplification are recorded. The signal recorded then is indicative of the character of the ground motion and is usually referred to collectively as a seismic signal which is in effect a composite signal made up of a plurality of electrical signals varying in frequency and amplitude.

The seismic signal thus detected and recorded is then processed and displayed in various ways. There are various ways of processing a seismic signal. A system for removing unwanted frequency components includes a plurality of bandpass filters in parallel and the seismic signal to be processed is connected to each filter. Each filter is selected to permit the passage of certain frequencies. The output of the filters are then combined into a composite signal from which the undesired frequency components have been eliminated.

The recombined signal is then amplified as desired and recorded or otherwise displayed. The various frequency components of the recombined signal are timewise and amplitude-wise the same as in the original signal with, of course, the unwanted frequencies filtered out. This system is quite useful in getting rid of various noises, etc., at the expense of some useful information.

A seismic shock signal is in effect a composite signal having different frequency components. As the seismic shock waves go through the earth the various frequency components thereof are attenuated differently by the travel of the wave through the earth. This results in the value of some of the desired frequency components being reduced and to the extent that they do not properly influence the characteristics of the seismic signal.

A seismic signal is made up of a great many pulses or signals which are the result of a single down-traveling pulse or signal which has been reflected back to the surface by many reflecting interfaces. The composition of a record therefore is influenced by the shape of the down-traveling pulse and the spacing of the reflectors; that is, interfaces. Some seismic signals differ in appearance, then, because the bed spacing or reflection coefficients differ, but some seismic records or signals taken in the same area are different because the shape of the down-traveling pulse varies from seismic disturbance to seismic disturbance. One object of this invention is to eliminate or reduce the variation between seismic signals which result from the difference in pulse shape.

In accordance with the present invention, in a preferred embodiment a composite seismic signal is fed to a plurality of narrow bandpass filter sections in parallel. In an especially preferred embodiment, the filter sections are spaced at about one cycle intervals or closer over the part of the frequency spectrum which is of interest. The output of each filter is fed to an automatic volume control (A.V.C.) unit which serves to amplify or limit, in the desired amount, that frequency component of the filter with which it is associated. In a preferred system, each frequency component has its gain automatically adjusted so that the output voltage amplitude is constant for all input frequency components. After each frequency component has been passed through its individual amplifier having a selected automatic gain control, the frequency components are added forming a composite seismic signal in which each selected frequency component's amplitude is given a value or is "weighted" as desired.

If the selected frequency is 30 to 60 cycles per second, the seismic signal is therefore "divided" into, for example, 31 separate components, i.e., 30, 31, 32 . . . 60 c.p.s., and each component subjected to A.V.C. The output amplitude of each filter and A.V.C. channel is then weighted as desired. All the components from the various filters and A.V.C. sections are then recombined to make up a recombined seismic signal. The recombined seismic signal, then, is a composite normalized signal in which each of the various frequency components in the selected spectrum have been given a selected weight or value.

The objects and a better understanding of the invention may be readily understood from the following description taken in conjunction with the drawings in which.

Figure 1:
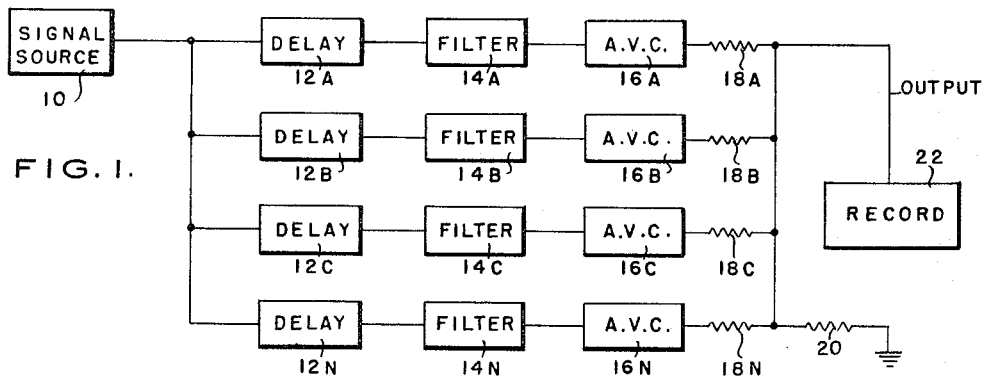
FIG. 1 is a block diagram showing the component parts of a preferred embodiment.

Referring now to the drawing and FIG. 1 in particular, there is illustrated in block diagram form a preferred seismic filter for processing a seismic signal in accordance with this invention. Reference numeral 10 represents a seismic signal source. This signal source may include a seismic signal amplified and coming directly from a geophone or geophone location; however, it will normally be a reproduced signal which has been recorded in a reproducible form such as on magnetic tape. The output from signal source 10 is fed to a plurality of parallel filter sections. Each filter section as shown has a delay circuit 12A, a narrow bandpass filter 14A, an automatic volume control unit 16A and an adding resistor 18A. Filter 14A is preferably a narrow bandpass filter with an adjustable center frequency. Filters 14B, 14C and 14N are likewise preferably narrow bandpass filters, each with adjustable center frequency. Each of the filters is designed to pass a different frequency component therethrough. As an example, if it is desired to separate and process 30 to 60 cyles per second information from the seismic signal, in a preferred operation there will be, for example, 31 filters, one-cycle per second apart. That is, there will be one filter passing 30 cycles per second information through; another passing 31 cycles per second information and so on until the last one passes 60 cycles per second information therethrough. Manifestly, each filter will have a given response to the signal passing therethrough so that the filters taken together can be said to have a comb-type response. That is, if the response of the filters as a whole are taken together, the amplitude-frequency plot of response as a function of the center frequencies of the filters would resemble a comb. It is desirable that the filter bandpass be sufficiently narrow so that most of the frequency components lying between channels are effectively rejected, and that any given frequency component can only effectively pass through one channel at most.

It is known that different frequencies going through filters such as 14A etc., are normally delayed different times unless means are provided to maintain a constant delay. In the present invention, it is usually desired that the output of filters 14A through 14N be passed therethrough in the same time so that there wil be no phase distortion caused by the filters. Therefore, delay circuits 12A, 12B, 12C through 12N are provided for each filter 14A, 14B, 14C through 14N. The delay units are of such a character that signals are passed to filters 14A through 14N in the proper time perspective so that no phase distortion occurs. These delay circuits may also be used to correct for phase distortion caused by any other process, or to introduce any desired phase curve.

Filter 14A has connected in series therewith an automatic volume control circuit 16A. Automatic volume control circuit 16A is similar to automatic volume control unit 16B, 16C and 16N. In a preferred unit, the amplification and the amount of automatic gain control of each automatic volume control 16A through 16N is adjustable in order that the different frequency components of the seismic signal that pass through the associated filter 14A through 14N may be evenly weighted or weighted otherwise as circumstances may dictate. Each frequency component passed through its automatic volume control unit 16A through 16N, is connected to adder resistor 18A through 18N, respectively. Resistor 20 is connected to the ground and serves as the common resistor of the resistance adding network. The output from adder resistors 18A through 18N is connected to a recorder means 22. Recorder means 22 may be any well known means for recording, displaying, or otherwise preserving a seismic signal.

Figure 2:
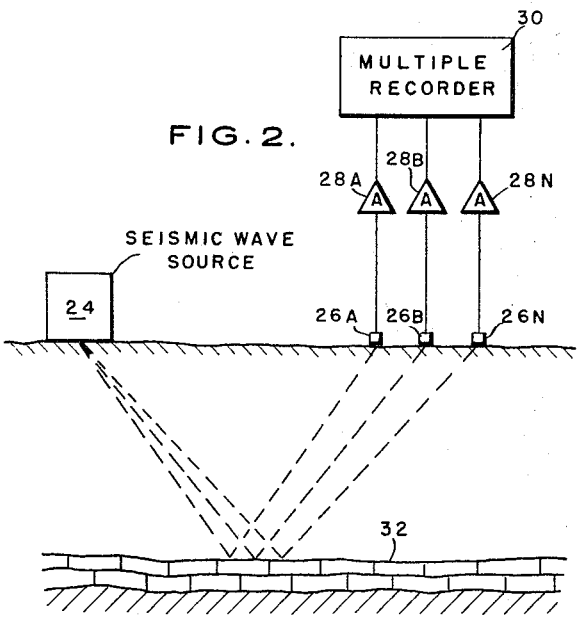
FIG. 2 illustrates in schematic form reflections of seismic waves.

Attention will now be directed briefly to FIG. 2 which shows a schematic system of generating a seismic signal. A seismic wave is generated from seismic wave source 24 at the surface of the earth. Geophones 26A, 26B and 26N are spaced from seismic wave source 24 and upon the surface of the earth. Each geophone 26A through 26N is connected to amplifier 28A through 28N. The output of each amplifier is fed to a multiple recording unit 30 which records in reproducible form the seismic signal from each amplifier. Multiple recorder 30 may be any reproducible type recording means. Geophone 26A, for example, may represent a geophone location rather than a single geophone. In other words, the geophone location may consist of an array of geophones spread about in order to better detect the seismic motion. In operation of the apparatus schematically shown in FIG. 2, a seismic shock wave is generated by seismic wave source 24. This shock travels in waveform downwardly through the earth's formation until it encounters discontinuities such as interface 32.

Figure 3:
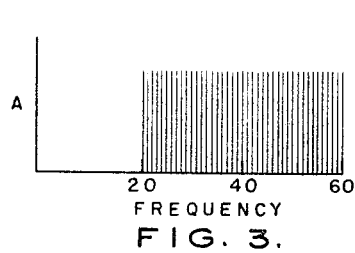
FIG. 3 illustrates a frequency force spectrum of one seismic wave source.
Figure 4:
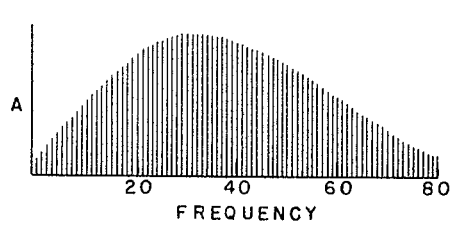
FIG. 4 is a frequency force spectrum of another seismic wave source.
Figure 5:
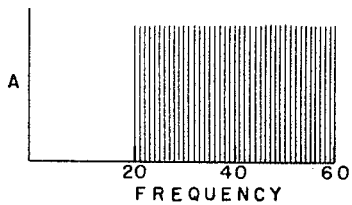
FIG. 5 illustrates a frequency force spectrum of a seismic signal processed in accordance with this invention in which all frequency components have been given equal weights; and, FIG. 6 illustrates in block diagram form another and an especially preferred embodiment of the invention.

A rather common practice in initiating a seismic shock wave is the detonation of an explosive charge at or near the surface of the earth. The frequency force spectrum for such an explosive may take the shape, for example, of that shown in FIG. 4. Higher frequencies not shown are present and are not illustrated inasmuch as they commonly are not of much interest. A particularly desired frequency force spectrum is illustrated in FIG. 3. A system for generating such a force spectrum is described in the co-pending application of Walter H. Glazier, Ser. No. 855,322, now Patent No. 3,185,250.

In seismic prospecting it is the practice to compare the detected seismic signals from various geophone locations which detect reflections from a common seismic shock point. It is also desirable to compare seismic signals or records detected by geophones from seismic disturbance points at various locations. Due to various factors the attenuation of the frequencies will vary from record to record.

A seismic signal is made up of a great many pulses which are the result of a single down-traveling pulse which has been reflected back to the surface by many reflecting interfaces. The composition of a seismic signal, therefore, is influenced by the shape of the pulse and the spacing of the reflectors. Some records (or seismic signals) differ in appearance because the bed spacing or reflection coefficient differs but they can also be different because the shape of the down-traveling pulse varies from seismic shock point to shock point. In the operation of this invention, the variations between the records which results from the difference in pulse shape is eliminated, or reduced to a negligible amount. A frequency spectrum is selected that gives useful information insofar as oil exploration is concerned. For example, a spectrum may be 30 to 60 cycles per second. In accordance with this invention, then, each frequency component of the composite signal making up to frequency spectrum is processed in a manner to eliminate the effects of the variation and the attenuation of the various frequency components. Any difference in record appearance remaining is due to bed spacing or reflecting coefficients. This process is called frequency normalizing and may be accomplished with the apparatus illustrated in FIG. 1.

In one preferred manner of operation of this system, a seismic shock wave having a uniform force frequency spectrum such as illustrated in FIG. 3 is initiated at or near the surface of the earth. These waves travel downwardly through the earth and some of them are reflected back toward the surface. There they are detected by geophones. However, the seismic signal detected at the surface normally will not have a force frequency spectrum closely resembling the spectrum of the seismic shock waves. This is primarily due to attenuation of the waves being different for various frequencies. Usually it can be said that the higher the frequency, the greater the attenuation. There are apparently many factors which influence the attenuation of the various frequency components of the seismic shock waves.

To carry out the prefered frequency normalizing process, a seismic signal to be processed is fed to each of the delay circuits 12A through 12N. These delay circuits are selected to compensate for the time that it takes its associated frequency component to pass through its filter, or to compensate for any other phase corrections desired. In other words, the frequency component signal coming out of filter 14A is in its proper time relationship with the frequency component coming out of filter 14B to 14N. Filter 14A is selected to have a narrow bandpass and to pass a center frequency component of 30 cycles per second. Likewise, filter 14B is set to pass a frequency component of 31 cycles per second. Each filter progressively is set for one cycle per second higher until filter 14N is reached which is set for a frequency of 60 cycles per second. The output of each filter 14A through 14N is passed through automatic volume control units 16A through 16N, respectively. These automatic volume control units, in a preferred operation, adjust the gain of each frequency component fed to it respectively such that the amplitude of each output of each automatic volume control unit is the same, or weighted as desired in accordance with the spectrum of the earth input signal. These normalized frequency components then are added through the adding resistors and the resulting combined seismic signal is then recorded. The frequency spectrum of the recombined signal is similar in appearance to the selected frequency spectrum such as the spectrum of the seismic shock. This process may be repeated for any number of signals which are desired to make up a seismic section. Or if desired, a plurality of systems as illustrated in FIG. 1 may be used simultaneously and the output signals simultaneously recorded. A seismic section as used herein is meant to be a plurality of seismic signals or records arranged in a side-by-side relationship in a manner to give a facsimile of a cross-section of the earth being prospected.

It is to be understood that most seismic signals or records recorded are produced wherein the seismic shock wave is the result of an explosive charge being detonated at or near the surface of the earth. In such case, the frequency spectrum can, for example, be similar to that shown in FIG. 4, but may vary greatly from place to place. In operation of this invention, the frequency range of interest is selected and this frequency range is processed in a manner similar to that described above. The frequency components of the detected signal can be processed to be weighted according to the input seismic shock; or some circumstances may dictate that the various frequencies be given different weights. For example, the automatic volume control unit for the higher frequencies may be set to give a higher amplification than the automatic volume control units for the lower frequencies. Weighting in various ways influences the shape of the combined output pulse. A particular shape may be more desirable in some instances than another shape. For example, the shortest possible pulse may be required, or a particular geological (or acoustic) horizon may be emphasized best by a particular spectrum shape. In these cases the spectrum would be appropriately weighted.

Figure 6:
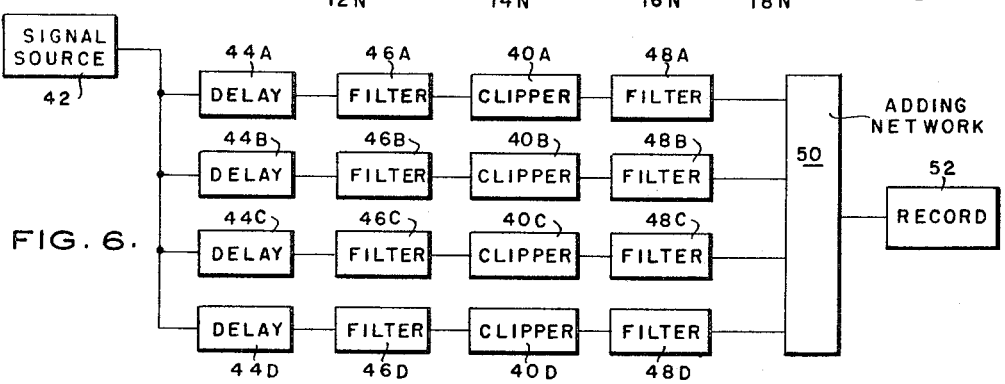

Attention is now directed toward FIG. 6 which illustrates another embodiment of the invention. The embodiment shown in FIG. 6 is similar to that shown in FIG. 1 however, the automatic volume control means is shown to be a clipper circuit 40A. Shown in FIG. 6 is a signal source 42 which is similar to signal source 10. The output from signal source 42 is fed to a plurality of parallel filter sections. Each filter section has a delay circuit 44A, a narrow bandpass filter 46A, a clipper circuit 40A, and a second filter 48A. Filters 46A through 46N can be similar to filters 14A through 14N and are each preferably narrow bandpass filters with an adjustable center frequency. A delay unit 44A through 44N is provided for each filter 46A through 46N similarly as delay units 12A through 12N to compensate for different delay times for the different filters.

The output from each filter 46A through 46N is fed to its respective clipper 40A through 40N. Clipping circuit 40A is preferably adjustable such that the level of a signal, positive and negative, which it passes is not permitted to exceed a certain value, such value being adjustable as desired. A suitable clipping circuit is illustrated in FIG. 3.7, page 46 of Waveforms by Chance, Hughes, Mac-Nichol, Sayre, and Williams, published by McGraw-Hill Book Company, Inc., New York, N.Y. In order for the clipping circuits to function properly, that is not to lose excessive phase information, the bandpass filters 46A through 46N should be rather narrow. If the filter bandpass is too wide, then the clipping circuits cannot be used as too much information will be lost. The bandpass of the filters used in the particular embodiment of FIG. 6 preferably should normally not be over about 1/10 of a cycle per second. The output of each clipper circuit 40A through 40N is fed respectively to filters 48A through 48N. These filters need not be as narrow as filters 46A through 46N and are used primarily to remove the harmonics of the lower frequencies which may interfere with the higher frequencies if the harmonics of the lower frequencies were not removed. The output of each filter 48A through 48N is electrically connected to adding network 50 which is of a character to combine the various outputs from the filters. The output from adding network 50 is electrically connected to recorder 52 which may be similar to recorder 22.

In operation the embodiment shown in FIG. 6 can be used to process a seismic signal similarly as that described above in regard to FIG. 1. For example, a seismic signal is processed by feeding a signal from source 42 to each of the delay circuits 44A through 44N. The delay circuits are selected to compensate for the time that it takes its associated frequency component to pass through its filter, or to compensate or add any phase correction or distortion desired. Thus, the frequency component signal coming out of filters 46A is in its proper or selected time relationship with the frequency component coming out of the other filters 46A through 46N. Each filter 46A through 46N is selected to pass a selected center frequency and there is a filter selected for each desired frequency component throughout the frequency range of interest. For example, if the frequency range of interest is from 20 to 60 cycles per second, then there could be 41 filters 1 cycle apart spread over the frequency range. The output from each filter 46A through 46N is fed to its clipper circuit 40A through 40N. Each clipper circuit 40A through 40N. Each clipper circuit 40A through 40N is set to limit the level of the frequency component fed to it so that such signal does not exceed a certain value. The level at which this clipping circuit is set is the level desired for that frequency component with which it is associated. The level of each of the filters can be selected so as to obtain a desired frequency spectrum of the recombined signal. The clipping circuit is especially advantageous in that it does not require several cycles to properly function. In other words, it amounts to essentially instantaneous automatic volume control. The output from clippers 40A through 40N is fed to their respective filters 48A through 48N in order to filter out harmonics that are introduced by the clipping of the lower frequencies which might interfere with the higher frequencies. The output of filters 48A through 48N then is added by adding network 50 which combines the different frequency components of interest and which have been given a preselected weight by the clipping process by clipping circuits 40A through 40N. The output from adding network 50 then is seen to be a seismic signal which has its frequency spectrum adjusted in a preselected manner. For example, the frequency spectrum of the recombined process signal may be similar in appearance as the frequency spectrum of the seismic shock wave. This process may be repeated for any number of signals which are desired to make up a seismic section.

It will be apparent to persons skilled in the art that many modifications of this invention are possible without departing from its spirit or scope. It is intended that the invention not be limited to the specific examples presented and it is therefore desired that only such limitations be imposed on the appending claims as are stated therein or required by the prior art.

What is claimed is:

1. A method of seismic exploration which comprises the steps of:

generating a seismic disturbance having a known force frequency spectrum on the surface of the earth;

detecting resulting seismic energy at a plurality of detection points spaced from said seismic disturbance to obtain a plurality of seismic signals;

separating each seismic signal into selected frequency components corresponding to frequency components which define the frequency spectrum of the seismic disturbance;

amplifying selected frequency components of each seismic signal to selected levels, such selected levels being the same for corresponding frequency components of the different seismic signals; and recombining the frequency components of each seismic signal following such amplification to obtain a plurality of recombined seismic signals, each such recombined signal having the same frequency spectrum as that of the seismic disturbance.

2. A method of seismic exploration which comprises the steps of:

generating at a selected point near the earth's surface a seismic disturbance having a known force frequency spectrum containing a plurality of frequency components;

detecting the seismic energy resulting at a detection point spaced from the point of said seismic disturbance;

separating the seismic signal thus detected into a plurality of frequency components corresponding to the said plurality of frequency components contained in the force frequency spectrum of said seismic disturbance; adjusting the gain of the separated frequency components such that the frequency force spectrum of the signal resulting from the recombination of the separated frequency components will correspond to the frequency force spectrum of said seismic disturbance; and recombining the separated frequency components following such gain adjustment.

3. A method as defined in claim 2 in which the separate frequency components of the seismic signal are delayed as necessary to eliminate phase distortion between said separate frequency components upon their recombination.

4. Apparatus for processing a seismic signal over a selected frequency range which comprises in combination:

a plurality of parallel sharply tuned narrow bandpass filter sections in which each filter section is tuned for a different frequency, such plurality of parallel sharply tuned narrow bandpass filter sections comprising in effect an overall comb-type response for a selected frequency range;

time delay means for each said frequency filter section and of a character such that the time delay of the frequency component passed through each said filter section and time delay means is a constant;

a clipping circuit connected to the output of each said filter section and in tandem with said filter section and its associated time delay means;

filter means connected to the output of each said clipper circuits; and means to add the outputs from each said filter means.

5. Apparatus as defined in claim 4 in which the sharply tuned narrow bandpass filter sections have a bandwidth of not greater than $\frac{1}{10}$ of a cycle per second.

6. Apparatus for processing a seismic signal to obtain a signal having a selected frequency spectrum which comprises in combination:

a plurality of parallel sharply tuned narrow bandpass filter sections with each filter section being tuned for a different frequency and spaced at not over about one cycle per second intervals over the part of the frequency spectrum of interest such that said plurality of said parallel sharply tuned narrow bandpass filter sections form an overall filter means having a comb-type response for a selected frequency range;

a plurality of amplitude control units, each unit being connected to the output of each of said filter sections;

a time delay means for each of said filter sections such that the time delay of the frequency component passed through each filter section and its respective amplitude control unit is a constant; and adding means to combine the outputs of said amplitude control units so as to obtain a recombined signal having a controlled frequency force spectrum and in which frequency components are in the same phase relationship as in the seismic signal.

7. Apparatus as defined in claim 6 in which the filter sections are of sufficiently narrow bandwidth that most of the frequency components lying between the center of the filter sections are effectively rejected.

References Cited
UNITED STATES PATENTS 2,558,868    7/1951    McCarty    181—0.5
2,979,692    4/1961    Grannemann et al.    340—15.5

BENJAMIN A. BORCHELT, *Primary Examiner.*

M. F. HUBLER, *Assistant Examiner.*